April 27, 1937. W. T. SHERMAN 2,078,288
METHOD AND APPARATUS FOR HEATING AND DEAERATING BOILER FEED WATER
Filed July 24, 1935
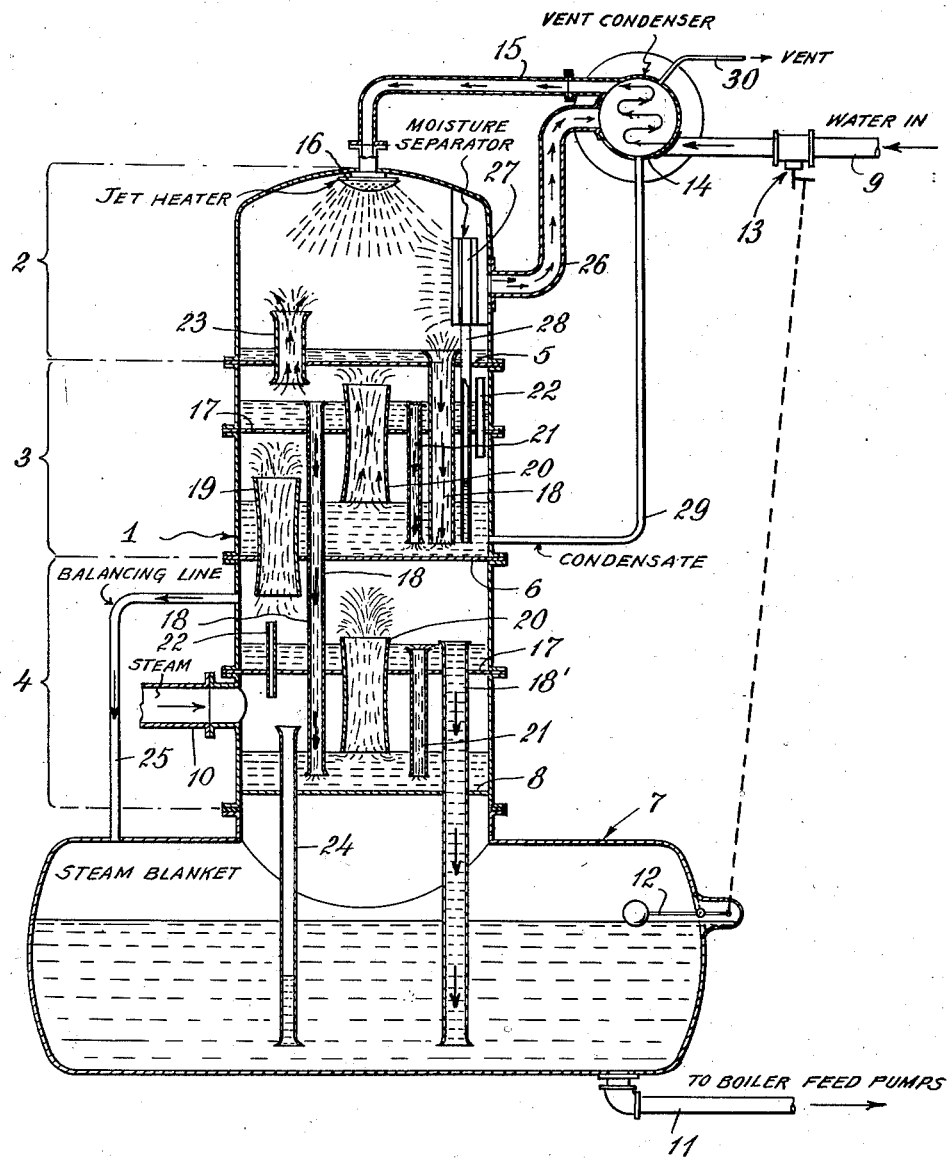
William T Sherman
INVENTOR
BY
ATTORNEY Patented Apr. 27, 1937

2,078,288

UNITED STATES PATENT OFFICE 2,078,288

METHOD AND APPARATUS FOR HEATING AND DEAERATING BOILER FEED WATER

William T. Sherman, Woodbury, N. J., assignor to Socony-Vacuum Oil Company, Incorporated, New York, N. Y., a corporation of New York Application July 24, 1935, Serial No. 32,837

5 Claims. (Cl. 183—2.5)

This invention is directed to methods and apparatus for freeing boiler feed water of oxygen and other dissolved gases while heating that water in preparation for its entry to the boiler.

It is quite important in the preparation of boiler feed waters, particularly of those intended for feeding boilers operated at higher pressures, i. e. above 250 pounds, and equipped with economizers, that the boiler feed water be completely freed of gaseous oxygen in dissolved form, because it has been found that this oxygen is an active agent in promoting corrosion and pitting of iron and steel exposed to the water. Such corrosion is prompted and made progressive and continuous by the action of dissolved oxygen in water. When the supply of oxygen ceases, the reaction rapidly slows down and the water can be spoken of as being deactivated in the sense that it has been rendered practically inert to metals. Water at a temperature of 100° F. if saturated with air at atmospheric pressure, contains approximately 4.6 cubic centimeters of oxygen at standard conditions per liter of water. This of course may be removed to a degree by the heating of the water under conditions which enable the escape of the gas. What has been regarded as a satisfactory degree of removal of dissolved oxygen may be pointed out by the fact that it has been stated that manufacturers of steel and iron pipe and tubes generally agree that if the oxygen content of the water is maintained below 0.2 cubic centimeter per liter, oxygen corrosion will be practically negligible, and certain makers of boiler economizers have been said to guarantee their tubes against corrosion providing the oxygen content of the water is maintained below 0.15 cubic centimeter liter. These figures are probably indicative of common practice in the field of low pressure boiler work. Recent modifications of practice in steam generation have required a substantially higher standard for the removal of dissolved oxygen.

The removal of dissolved oxygen is most frequently accomplished in connection with the heating of the feed water, since the heating of the feed water tends to boil out of it the gases dissolved therein. Theoretically, water at its boiling point under any given pressure must be free of dissolved gases. As a matter of actual commercial fact, due to difficulties in completely enabling all particles of a body of water at the boiling temperature to completely free themselves of gases, it is found that a temperature somewhat above the boiling point for the existing pressure is necessary to completely free water of dissolved oxygen. This may be due to several reasons. Part is probably due to the fact that some of the water in a bulk supply is below the surface and consequently under slightly increased pressure. Another possible reason is the presence of dissociated water molecules giving rise to free oxygen. The possible importance of the first reason pointed out is shown by the fact that in water heaters of the open type or of the jet type, where the water is heated by allowing it to cascade through steam, a considerably more effective removal of oxygen can be obtained than with methods wherein a bulk supply is heated.

This invention is specifically directed to method and apparatus for the efficient deaeration of water to an extreme degree without undue rise in temperature being necessary.

In the combined deaeration and heating of feed water in present practice, it is normally the practice to heat the liquid and then cascade it over a series of trays to obtain the separation of the water in thin films while subjecting it to countercurrent scrubbing with steam or to pass the heated water over a series of perforated plates and scrub the drops thus produced with steam on its way to the heating section of the scrubber. Neither of these have been capable of producing a minimum content of dissolved gases without excessive treatment and equipment, and when such minimum oxygen contents have been required, it is almost uniform practice to heat the water to as high a temperature as practicable and then release it into a chamber wherein a partial vacuum is maintained, thus flashing off some steam and a large portion of the dissolved gases. This operation of course brings about a drop in the temperature of the heated water, due to the change of state due to flashing and the water from the deaerating flasher must be reheated to supply this heat loss before entering to the boiler. This gives to the total system a heat loss and impairs the efficiency of the heat cycle of the power plant as a whole, due to the flash drop in temperature. For example, using heating steam bled from the turbine at 215° and flashing to a temperature of 190° F., then the action of the deaerator has deprived the cycle of the work which the heating steam could have done in the turbine between 215° and 190°. This loss may be avoided if the operation is carried out in a deaerator which will insure complete removal of oxygen at a temperature near that at which steam is withdrawn.

It is an object of this invention to provide a method whereby feed water may be substantially and completely deaerated without excessive heating, as by high temperature steam, and without loss of heat as by vacuum flashing. An important object is the provision of such a process accomplished by the contacting of steam with a turbulently flowing stream of water droplets. A further important object is the provision of an apparatus wherein the process may be carried out.

I have found that if water be finely divided and contacted with steam in a rapid and turbulently moving stream of vapors and particles, that a complete and efficient heat exchange between the steam and the water particles is possible, and that the nature of the operation is such that there is a maximum tendency for dissolved gases to free themselves from the water particles and unite with the vapor phase. I have found that if this contacting be carried out in a certain way, that the insurement of proper conditions for the maximum results of the operation is automatic in nature.

In order that my invention may be more completely understood, I now refer to a drawing which is attached to and made a part of this specification. The single figure of this drawing illustrates in somewhat diagrammatic form an apparatus for heating and deaerating feed water in accordance with my invention. This apparatus consists of a contacting tower 1, divided into sections 2, 3 and 4, by partitions 5 and 6 mounted above a hot feed reservoir 7, chamber 4 being separated from the reservoir by partition 8. Feed water to be heated is introduced through line 9, steam for the heating of the water is introduced through line 10, and hot deaerated feed water is removed from the reservoir to the boiler by line 11. A float 12, placed within the hot feed reservoir 7, is operatively connected to a control valve 13, and the amount of water supplied the system is thus controlled in accordance with the demands of the boiler. The cold water introduced to the system first passes through a vent condenser 14, the function of which is explained hereinafter more in detail, and thence through pipe 15 to the top of chamber 2, being introduced into chamber 2 through a jet forming or spray forming means 16. The atmosphere in chamber 2 is composed of steam which has passed through the lower sections of the apparatus, and the incoming water which is sprayed into chamber 2 is heated by contact with and condensation of this steam. The function of this chamber 2 is merely that of the ordinary open feed water heater and in place of the jet 16 there may be substituted a series of cascade pans or perforated plates in which the water is caused to flow countercurrent to steam, or any other of the usual devices employed in feed water heaters of the open type. Sections 3 and 4 are the sections wherein the greater portion of the deaeration and the final heating of the feed water are carried out in accordance with this invention. They are exactly similar and analogous in operation, and the explanation hereafter will serve for both. Like parts in each section are designated by like numbers. Each section is divided internally by a water-tight partition 17 into a reservoir chamber below the partition and a release chamber above the partition. Each section is initially supplied with water through a pipe 18, that leading into section 3 serving to bring water into the lower portion of section 3 from the heating section 2, and that leading into section 4 serving to bring water into the reservoir portion of section 4 from the release portion of section 3. A third pipe designated as 18' serves to remove water from the release chamber of section 4 in an exactly similar manner, discharging into the heated water reservoir 7. Steam is led into the open space above the level of water in the reservoir chamber of each of sections 3 and 4. In the case of section 4, the steam is introduced through the original steam inlet pipe 10. In the case of section 3, the steam is introduced from the release chamber portion of section 4 into the reservoir portion of section 3, through a tube 19. In each of sections 3 and 4, there is located one or more contact tubes 20, these tubes extending from a point elevated above the bottom of the reservoir chamber through the partitions 17, and terminating within the release chamber at a point above the level of the water therein, which level is determined by the elevation of the end of the tubes 18 and 18' in each respective release chamber. Each of sections 3 and 4 is further provided with a recirculation tube 21, the upper end of which is located somewhat below the level of the water in the respective release chamber and the lower end of which is located well below the lower end of the contacting tube 20. Each section is further provided with a small tube 22, so positioned as to allow communication between the vapor spaces above and below the partitions 17, so that when the apparatus is shut down, the condensation of the vapors will not cause differential vacua to exist. The size of these pipes must necessarily be quite small so that when the apparatus is in operation, the resistance to flow through them will be appreciably greater than the resistance to flow through the contactor tubes 20. Vapor is removed from the release chamber of section 3 to the heating section 2 by means of a tube 23. In operation, the action of each of these sections is as follows: The water collected in the reservoir section is forced into the contacting tube 20 until the level outside that tube is so depressed that the steam can enter around the bottom of the tube and thereafter in operation the level of this water will remain a short distance below the lower end of the contacting tube 20. The steam entering the tube 20 will sweep over the surface of the liquid at a velocity such that it will disengage therefrom a very considerable portion of the water in the form of droplets of extremely small size, and these droplets will pass up through the contacting tube in company with the steam in the form of an exceedingly turbulent rapidly flowing stream of vapor and water particles. This stream will be discharged into the release chamber where the water and vapor are separated, the vapor passing upward to a subsequent section and the water collecting within the release chamber. The proportions of the apparatus are so chosen that the amount of water drawn upwardly through the contacting tube and discharged in the release chamber to collect therein is considerably greater in amount per unit of time than the water charged to the heating and deaerating unit. Consequently, the tubes 21 and 18 are so proportioned and so positioned that tube 21 will return a considerable amount of the water from the release chamber of each section to the reservoir chamber of the same section, for recirculation through the contacting tube. The remainder of the water from the release chamber of each section will flow to the reservoir chamber of the section next lower, or in the case of the bottom section through pipe 18' to the treated water reservoir.

In the lowermost section, that is section 4, an overflow pipe 24 is provided, so positioned that when the apparatus is shut down and water tends to collect in the reservoir chamber of the lowest section, this water will be drained into the treated water reservoir and not allowed to build up to such a level that it floods the steam inlet pipe. A vapor balancing line 25 is provided for the equalization of vapor pressures above and below partition 8, this also serving to maintain a blanket of steam under the pressure of the apparatus above and communicating with the surface of the water in the reservoir 7 to prevent the entrance of oxygen through leaks or otherwise into that atmosphere which might result in re-contamination of the treated fluid. The uncondensed vapors and liberated oxygen collecting in section 2 at the top of the apparatus are vented through pipe 26 to the vent condenser 14, being first sent through any competent form of moisture separator 27, which may be installed either within section 2 or intermediate of pipe 26, and which should be fitted with a moisture return pipe 28, leading preferably to the reservoir chamber of the uppermost deaerating section. The vent condenser 14 is a tubular heat exchanger wherein the steam remaining in the vent gases is condensed by heat exchange with incoming cold feed water and collected to be returned to the system through condensate return line 29, which preferably communicates with the reservoir chamber of the uppermost deareating section. The uncondensed gases from the vent condenser are sent to the atmosphere through vent line 30.

This apparatus may of course be operated at any pressure, but is preferably operated at pressures above atmospheric pressure, ranging from only a few pounds gauge where exhaust steam of low pressure is used, and the feed water is heated only to temperatures in the neighborhood of 212° F. to such higher pressures as may be desirable where the temperature in the boiler is considerably higher, and heating is performed by steam at a considerably higher temperature level. In all cases the heating performed must be such that the water is heated to a temperature approximating its boiling point under the pressure obtaining in the system, since such heating is necessary for the efficient removal of air.

In operation of a deaerating feed water heater of this design, I have been able to obtain substantially complete deaeration, as exemplified by the following test, wherein a single contact section was used.

Test B

Heater chamber temperature_____ 218° F.
Reservoir temperature_____ 209 °F.
Dissolved oxygen cc liter_____ 0.0

I ascribe the ability of this process to the fact that it contacts the steam with very minute droplets of water, under conditions permitting the maximum freedom of passage of gas from within the droplet to within the steam, coupled with the ability to recirculate a high percentage of the water, if desired, and subject it to retreatment, and further coupled with the inherent incapability of the process used to allow any water to bypass out of contact with the heating steam.

In the diagrammatic drawing attached hereto, the contacting of steam and water is shown as being performed in a single contacting tube in each stage. As a matter of actual practice, it will be preferred to use a plurality of tubes, since requirements of space and efficient contacting may be more easily met with several tubes 20 of a convenient size rather than with one large tube of equivalent periphery or of equivalent cross sectional area. Increases of capacity can consequently be made by increasing the number of contacting tubes.

I do not claim, as original with me, the association of the contacting tube 20, the partition 17, and the drain 18, nor the general method of their operation, except in connection with the additional means set forth, and for the purpose and in the manner described in the following claims.

In the claims, the term deaeration is understood to mean the removal of dissolved oxygen from the feed water to an extent sufficient to render the treated feed water substantially free from corrosive properties due to the presence of such oxygen.

I claim:

1. A process for heating and deaerating feed water for boilers comprising the following steps: Heating water by contact with steam, collecting said heated water in a body, creating and maintaining a high velocity stream of water droplets by passing steam at high velocity into contact with the surface of said water body, confining the stream of water droplets and the said steam together as a turbulently flowing stream to further heat the water to a temperature near its boiling point and substantially complete the liberation of gases therefrom, separating the steam from the water, passing the steam to the first-mentioned heating stage, and passing the water to a boiler.

2. A process for heating and deaerating feed water for boilers comprising the following steps: Heating water by contact with steam, collecting said heated water in a body, creating and maintaining a high velocity stream of water droplets by passing steam at high velocity into contact with the surface of said water body, confining the stream of water droplets and the said steam together as a turbulently flowing stream to further heat the water to a temperature near its boiling point and substantially complete the liberation of gases therefrom, separating the steam from the water, returning a portion of the separated water to the said body of water, passing the steam to the first-mentioned heating stage and passing the remainder of the water to a boiler.

3. A process for deaerating heated boiler feed water comprising the steps of maintaining a body of heated water, passing steam in contact therewith at high velocity to disrupt the surface thereof and entrain therefrom a stream of water droplets, passing the combined stream of steam and water droplets through a region of turbulent flow, separating the steam and the water, and returning a portion of the separated water to the said body.

4. Apparatus for the heating and deaerating of boiler feed water comprising a heating zone wherein water is heated by open contact with and at least partial condensation of steam; at least one deaerating zone consisting of a closed storage container, means to feed heated water thereto, an inlet for steam into the space above the water therein, one or more contacting tubes of relatively large diameter therein terminating adjacent the surface of the water therein so that steam in passing into said contacting tube may entrain and carry with it water from the storage space, and a separating container into which such contact tube leads; means to pass steam from the deaerating zone to the heating zone, a deaerated water storage vessel, and means to pass water thereto from the separator of the deaerating zone.

5. Apparatus for the heating and deaerating of boiler feed water comprising a heating zone wherein water is heated by open contact with and at least partial condensation of steam; at least one deaerating zone consisting of a closed storage container, means to feed heated water thereto, an inlet for steam into the space above the water therein, one or more contacting tubes of relatively large diameter therein terminating adjacent the surface of the water therein so that steam in passing into said contacting tube may entrain and carry with it water from the storage space, a separating container into which such contact tube leads; means to return a portion of the water from the separator to the storage container for recontacting; means to pass steam from the deaerating zone to the heating zone, a deaerated water storage vessel, and means to pass water thereto from the separator of the deaerating zone.

WILLIAM T. SHERMAN.